United States Patent
Spieker et al.

(10) Patent No.: US 10,599,127 B2
(45) Date of Patent: Mar. 24, 2020

(54) SYSTEM AND METHOD FOR MANUFACTURING AND CONTROL THEREOF

(71) Applicant: Lincoln Global, Inc., Santa Fe Springs, CA (US)

(72) Inventors: Daniel J. Spieker, Windsor, CO (US); Levi J. Mitchell, Windsor, CO (US); Khaled M. Ben-Gharbia, Fort Collins, CO (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 0 days.

(21) Appl. No.: 16/286,741

(22) Filed: Feb. 27, 2019

(65) Prior Publication Data

US 2019/0187665 A1 Jun. 20, 2019

Related U.S. Application Data

(62) Division of application No. 15/437,086, filed on Feb. 20, 2017.

(Continued)

(51) Int. Cl.
*G06F 19/00* (2018.01)
*G05B 19/4061* (2006.01)
(Continued)

(52) U.S. Cl.
CPC ........ *G05B 19/4061* (2013.01); *B25J 9/1669* (2013.01); *B25J 9/1676* (2013.01);
(Continued)

(58) Field of Classification Search
CPC ...... B25J 11/005; B25J 9/1669; B25J 9/1676; G05B 19/4061; G05B 19/4097; G05B 19/4099; G05B 2219/39096
See application file for complete search history.

(56) References Cited

U.S. PATENT DOCUMENTS 4,380,696 A 4/1983 Masaki
4,568,816 A 2/1986 Casler
(Continued)

FOREIGN PATENT DOCUMENTS

CN 101512453 B 11/2011
CN 105171742 B 6/2016
(Continued)

OTHER PUBLICATIONS

"Optimal Trajectory Planning of Manipulators: A Review"—Ata, Atef A. (jestec.taylors.edu.my/Vol%202%20Issue%201%20April%2007/32-54%20Ata.pdf) Apr. 2007—23 pages (pp. 32-54 from the Journal of Engineering Science and Technology, Apr. 2007).
(Continued)

*Primary Examiner* — Harry Y Oh
(74) *Attorney, Agent, or Firm* — David J. Muzilla

(57) ABSTRACT

Embodiments for performing manufacture processes are disclosed. In one embodiment, a system includes a tool to be used in a manufacture process on a workpiece. The system includes a robot having an arm. The arm has an attachment point and is configured to move the tool, when attached to the attachment point, in multiple degrees of freedom during the manufacture process. A robot controller of the robot controls the movement of the arm based on motion parameters to perform the manufacture process via the tool. The system includes a power source having power electronics to generate electrical output power, based on electrical input parameters, provided to the tool during the manufacture process. A power source controller of the power source is configured to communicate with the robot controller, allowing a path planner component to generate the motion parameters used to perform the manufacture process while avoiding robot collision conflicts.

16 Claims, 9 Drawing Sheets

Related U.S. Application Data

(60) Provisional application No. 62/418,732, filed on Nov. 7, 2016.

(51) Int. Cl.
  *B25J 9/16* (2006.01)
  *G05B 19/4099* (2006.01)
  *B25J 11/00* (2006.01)
  *G05B 19/4097* (2006.01)

(52) U.S. Cl.
  CPC ......... *B25J 11/005* (2013.01); *G05B 19/4097* (2013.01); *G05B 19/4099* (2013.01); *G05B 2219/39096* (2013.01)

(56) References Cited

U.S. PATENT DOCUMENTS

| | | | | |
|---|---|---|---|---|
| 4,935,598 | A * | 6/1990 | Ward | B23K 9/26 |
| | | | | 219/125.1 |
| 5,396,160 | A | 3/1995 | Chen | |
| 5,484,975 | A * | 1/1996 | Itatsu | B23K 11/115 |
| | | | | 219/86.7 |
| 5,742,022 | A * | 4/1998 | Crawford | B21D 39/021 |
| | | | | 219/158 |
| 5,945,011 | A * | 8/1999 | Takano | B23K 11/11 |
| | | | | 219/108 |
| 6,021,361 | A | 2/2000 | Taninaga | |
| 6,278,082 | B1 * | 8/2001 | Shimogama | B23K 9/1274 |
| | | | | 219/125.1 |
| 6,401,001 | B1 * | 6/2002 | Jang | H01L 21/288 |
| | | | | 204/192.15 |
| 6,636,776 | B1 * | 10/2003 | Barton | B23K 9/1062 |
| | | | | 219/109 |
| 8,386,080 | B2 | 2/2013 | Bosscher | |
| 8,527,091 | B2 | 9/2013 | Bosscher | |
| 8,706,300 | B2 | 4/2014 | Krause | |
| 8,855,812 | B2 | 10/2014 | Kapoor | |
| 2003/0225479 | A1 | 12/2003 | Waled | |
| 2008/0243306 | A1 * | 10/2008 | Koike | B23K 9/12 |
| | | | | 700/250 |
| 2011/0108536 | A1 * | 5/2011 | Inada | B23K 9/0953 |
| | | | | 219/130.1 |
| 2012/0215351 | A1 * | 8/2012 | McGee | B25J 9/1666 |
| | | | | 700/248 |
| 2016/0105935 | A1 * | 4/2016 | Jones | H05B 11/00 |
| | | | | 219/601 |
| 2016/0114418 | A1 * | 4/2016 | Jones | B62D 57/024 |
| | | | | 219/124.1 |
| 2016/0187874 | A1 | 6/2016 | Chen | |
| 2018/0169813 | A1 * | 6/2018 | Wanner | B23B 41/00 |

FOREIGN PATENT DOCUMENTS

| | | |
|---|---|---|
| EP | 1 901 151 A1 | 3/2008 |
| JP | 09-141437 A | 6/1997 |
| JP | 2004-243461 A | 9/2004 |
| WO | 2011/039542 A1 | 4/2011 |
| WO | 2011/035069 A3 | 5/2011 |

OTHER PUBLICATIONS

"Path Planning Optimization for Teaching and Playback Welding Robot"—Wang, Yuehai; Chi, Ning (www.iaesjournal.com/online/index.php/TELKOMNIKA/article/view/2061) Feb. 2013—9 pages (pp. 960-968 from the Indonesian Journal of Electrical Engineering and Computer Science, Feb. 2013).

"Failure-Tolerant Path Planning for Kinematically Redundant Manipulators Anticipating Locked-Joint Failures"—Jamisola, Rodrigo S., Jr.; Maciejewski, Anthony A.; Roberts, Rodney G. (ieeexplore.ieee.org/document/1668247/) Aug. 7, 2006—10 pages (pp. 603-612 from IEEE Transactions on Robotics, vol. 22, Issue 4).

"Real-Time Multi-Processing Fuzzy Logic Adaptive Control Gas Tungsten Arc Welding System"—Austin, Mary A. (ieeexplore.ieee.org/document/557652/) 1996—4 pages (pp. 139-142 from Proceedings of the 4th International Workshop on Parallel and Distributed Real-Time Systems, conference date Apr. 15-16, 1996).

"Path Planning for Mobile Manipulators for Mutliple Task Execution"—Carriker, Wayne F.; Khosla, Pradeep K.; Krogh, Bruce H. (ieeexplore.ieee.org/document/88151/) Jun. 1991—6 pages (pp. 403-408 from IEEE Transactions on Robotics and Automation, vol. 7, No. 3).

"Planning Time-Optimal Robotic Manipulator Motions and Work Places for Point-to-Point Tasks"—Dubowsky, S.; Blubaugh, T.D. (ieeexplore.ieee.org/document/34775/) Jun. 1989—5 pages (pp. 377-381 from IEEE Transactions on Robotics and Automation, vol. 5, No. 3).

"Global Time Optimal Motions of Robotic Manipulators in the Presence of Obstacles"—Shiller, Zvi; Dubowsky, Steven (ieeexplore.ieee.org/document/12076/) 1988—6 pages (pp. 370-375 from Proceedings of the IEEE International Conference on Robotics and Automation, conference date Apr. 24-29, 1988).

"On Time Optimal Path Control of Manipulators with Bounded Joint Velocities and Torques"—Zlajpah, L. (ieeexplore.ieee.org/document/506928/) Apr. 1996—6 pages (pp. 1572-1577 from Proceedings of the IEEE International conference on Robotics and Automation, conference date Apr. 22-28, 1996).

"Genetic Algorithms in Computer-Aided Design of Robotic Manufacturing Cells"—Pashkevich, Anatoly, Department of Automatic Control, Belarusian State university of Informatics and Radioelectronics (citeseerx.ist.psu.edu/viewdoc/download?doi=10.1.1.24.8954&rep=rep1&type=pdf) May 2000—12 pages.

"Kinematic Design of Redundant Robotic Manipulators for Spatial Positioning that are Optimally Fault Tolerant"—K. M. Ben-Gharbia, A. A. Maciejewski, and R. G. Roberts (ieeexplore.ieee.org/document/6553095/) Oct. 2013—8 pages (pp. 1300-1307 from the Proceedings of the IEEE Transactions on Robotics, vol. 29, No. 5).

"A Kinematic Analysis and Evaluation of Planar Robots Designed from Optimally Fault-Tolerant Jacobians"—K. M. Ben-Gharbia, A. A. Maciejewski, and R. G. Roberts (ieeexplore.ieee.org/document/6725694/) Apr. 2014—9 pages (pp. 516-524 from the Proceedings of the IEEE Transactions on Robotics, vol. 30, No. 2).

"Designing a Failure-Tolerant Workspace for Kinematically Redundant Robots"—R. C. Hoover,R. G. Roberts, A. A. Maciejewski, P. S. Naik, and K. M. Ben-Gharbia (ieeexplore.ieee.org/document/6870450/?part=1) Oct. 2015—12 pages (pp. 1421-1432 from the Proceedings of the IEEE Transactions on Automation Science and Engineering, vol. 12, No. 4).

"Kinematic Design of Manipulators with Seven Revolute Joints Optimized for Fault Tolerance"—K. M. Ben-Gharbia, A. A. Maciejewski, and R. G. Roberts (ieeexplore.ieee.org/document/7339708/) Oct. 2016—10 pages (pp. 1364-1373 from the Proceedings of the IEEE Transactions on Systems, Man, and Cybernetics: Systems, vol. 46, No. 10).

"An illustration of generating robots from optimal fault-tolerant Jacobians"—K. M. Ben-Gharbia, A. A. Maciejewski, and R. G. Roberts (https://www.engr.colostate.edu/~aam/pdf/conferences/131.pdf) Nov. 2010—8 pages (pp. 453-460 from the Proceedings of the 15th IASTED International Conference on Robotics and Applications, Cambridge, Massachusetts, conference date Nov. 1-3, 2010).

"Examples of Planar Robot Kinematic Designs from Optimally Fault-Tolerant Jacobians"—K. M. Ben-Gharbia, R. G. Roberts, and A. A. Maciejewski (ieeexplore.ieee.org/document/5980297/) May 2011—6 pages (pp. 4710-4715 from the Proceedings of the IEEE International Conference on Robotics and Automation (ICRA2011), Shanghai, China; conference date May 9-13, 2011).

"Examples of Spatial Positioning Redundant Robotic Manipulators that are Optimally Fault Tolerant"—K. M. Ben-Gharbia, A. A. Maciejewski, and R. G. Roberts (ieeexplore.ieee.org/document/6083887/) Oct. 2011—6 pages (pp. 1526-1531 from the Proceedings of the IEEE International Conference on Systems, Man, and Cybernetics, Anchorage, Alaska; conference date Oct. 9-12, 2011).

"An Example of Computing the Failure-Tolerant Workspace Area for a Planar Kinematically Redundant Robot"—P. S. Naik, A. A. Maciejewski, R. G. Roberts, R. C. Hoover, and K. Ben-Gharbia

(56) References Cited

OTHER PUBLICATIONS (ieeexplore.ieee.org/document/6653918/) Aug. 2013—6 pages (pp. 306-311 from the Proceedings of the IEEE International Conference on Automation Science and Engineering (CASE), Madison, Wisconsin; conference date Aug. 17-21, 2013).

Chen et al.; "Laser Vision Sensing Based on Adaptive Welding for Aluminum Alloy"; Frontiers of Mechanical Engineering in China; vol. 2, No. 2; Dated Apr. 1, 2007; pp. 218-223.

Noruk; "New Sensing Technology for Robotic Joining Automation"; National Robotic Arc Welding Conference 2015; Dated Jun. 10, 2015; URL:http://www.matc.edu/tas/RAWC/upload/15-Smart-Sensors.pdf; pp. 1-38.

Extended European Search Report from Corresponding Application No. 17001776.8; dated Sep. 27, 2018; pp. 1-12.

\* cited by examiner

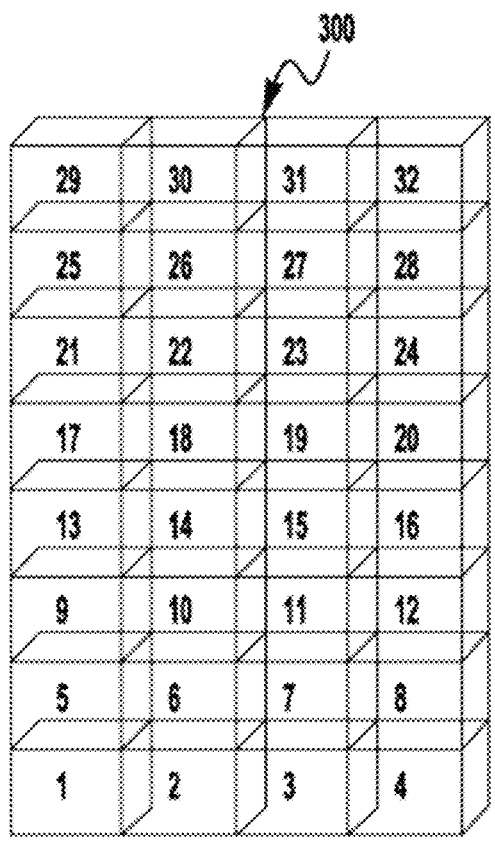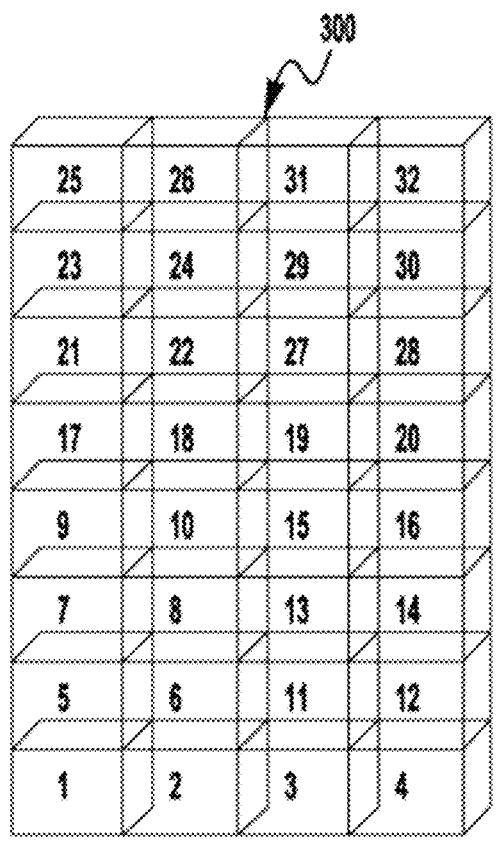
FIG. 6A                    FIG. 6B

SYSTEM AND METHOD FOR MANUFACTURING AND CONTROL THEREOF

PRIORITY

The present application is a U.S. Divisional Patent Application of U.S. Non-provisional patent application Ser. No. 15/437,086, filed on Feb. 20, 2017, which is incorporated herein by reference in its entirety, and which claims priority to U.S. Provisional Patent Application No. 62/418,732, filed on Nov. 7, 2016, which is incorporated herein by reference in its entirety.

TECHNICAL FIELD

Devices, systems, and methods consistent with embodiments of the present invention relate to manufacturing (e.g., welding, additive, cutting), and more specifically to offline tools for controlling and code importation of manufacturing protocols.

BACKGROUND

The use of robotic systems and semi-robotic systems to manufacture, weld, and cut workpieces is well known and applications and uses continue to grow. Advancements in such systems, for example additive manufacturing, are occurring in both hardware and software. Typically, in such applications, a 3D model of a workpiece or part is imported into a software application which converts the model into machine-readable code (i.e., g-code). This g-code is then used by the robotic system to build, cut and/or weld the workpiece. However, this g-code is designed for robots and/or systems that only have three (3) axes of freedom, and there is little or no development on such systems for more complex robots or systems using more than three (3) axes of freedom, up to and beyond, six (6) axes of freedom systems. Thus, it is difficult in current systems to translate 3D g-code models for higher axis systems.

Further limitations and disadvantages of conventional, traditional, and proposed approaches will become apparent to one of skill in the art, through comparison of such approaches with embodiments of the present invention as set forth in the remainder of the present application with reference to the drawings.

BRIEF SUMMARY OF THE INVENTION

Exemplary embodiments of the present invention include systems and methods to allow 3D computer models or parts and workpieces to be used on higher axis systems, having four (4) or more degrees of freedom.

In one embodiment, a system is provided that includes a tool configured to be used in a manufacture process on a workpiece. The manufacture process may be, for example, a welding process, an additive manufacturing process, or a plasma cutting process. The system includes a robot having an arm with an attachment point. The arm is configured to move the tool, when attached to the attachment point, in multiple degrees of freedom during the manufacture process. The robot also includes a robot controller configured to control movement of the arm based on motion parameters to perform the manufacture process via the tool. The system includes a power source having power electronics. The power electronics are configured to generate electrical output power, based on electrical input parameters, which is provided to the tool during the manufacture process. The power source also includes a power source controller configured to receive the motion parameters from the robot controller and adjust the electrical input parameters based on the motion parameters to allow generation of adjusted electrical output power via the power electronics. In one embodiment, the power source controller is configured to adjust the motion parameters based on the electrical input parameters to generate adjusted motion parameters and provide the adjusted motion parameters to the robot controller. In one embodiment, the power source controller is configured to adjust, based on the motion parameters, a wire feed speed to generate an adjusted wire feed speed of a consumable electrode used by the tool during the manufacture process. In one embodiment, the robot controller includes a processor and a non-transitory computer-readable medium storing a path planner component. The path planner component includes instructions that when executed by the processor cause the robot controller to generate the motion parameters used to perform the manufacture process while avoiding robot collision conflicts. In another embodiment, the power source controller includes the path planner component. The path planner component includes a reach configuration component that includes data related to physical attributes, motion attributes, kinematics, and limitations of the robot. The path planner component also includes a collision avoidance evaluator configured to, using the reach configuration component, determine if an anticipated robot path results in any robot collision conflicts. A user can modify the robot path and/or the manufacture process to avoid the robot collision conflicts with the aid of the collision avoidance evaluator.

In one embodiment, a system is provided that includes a tool configured to be used in a manufacture process on a workpiece. The manufacture process may be, for example, a welding process, an additive manufacturing process, or a plasma cutting process. The system includes a robot having an arm with an attachment point. The arm is configured to move the tool, when attached to the attachment point, in multiple degrees of freedom during the manufacture process. The robot also includes a robot controller configured to control movement of the arm based on motion parameters to perform the manufacture process via the tool. The system includes a power source having power electronics. The power electronics are configured to generate electrical output power, based on electrical input parameters, which is provided to the tool during the manufacture process. The power source also includes a power source controller configured to receive the motion parameters from the robot controller and adjust the motion parameters based on the electrical input parameters to generate adjusted motion parameters, and provide the adjusted motion parameters to the robot controller. In one embodiment, the power source controller is configured to adjust the electrical input parameters based on the motion parameters to allow generation of adjusted electrical output power via the power electronics. In one embodiment, the power source controller is configured to adjust, based on the motion parameters, a wire feed speed to generate an adjusted wire feed speed of a consumable electrode used by the tool during the manufacture process. In one embodiment, the robot controller includes a processor and a non-transitory computer-readable medium storing a path planner component. The path planner component includes instructions that when executed by the processor cause the robot controller to generate the motion parameters used to perform the manufacture process while avoiding robot collision conflicts. In another embodiment, the power source controller includes the path planner component. The path planner component includes a reach configuration component that includes data related to physical attributes, motion attributes, kinematics, and limitations of the robot. The path planner component also includes a collision avoidance evaluator configured to, using the reach configuration component, determine if an anticipated robot path results in any robot collision conflicts. A user can modify the robot path and/or the manufacture process to avoid the robot collision conflicts with the aid of the collision avoidance evaluator.

In one embodiment, a system is provided that includes a tool configured to be used in a manufacture process on a workpiece. The manufacture process may be, for example, a welding process, an additive manufacturing process, or a plasma cutting process. The system includes a robot having an arm with an attachment point. The arm is configured to move the tool, when attached to the attachment point, in multiple degrees of freedom during the manufacture process. The robot also includes a robot controller configured to control movement of the arm based on motion parameters to perform the manufacture process via the tool. The system includes a power source having power electronics. The power electronics are configured to generate electrical output power, based on electrical input parameters, which is provided to the tool during the manufacture process. The power source also includes a power source controller. The power source controller and the robot controller are configured to communicate information between each other. At least one of the robot controller or the power source controller includes a processor and a non-transitory computer-readable medium storing a path planner component. The path planner component includes instructions that when executed by the processor cause at least one of the robot controller or the power source controller to generate the motion parameters used to perform the manufacture process while avoiding robot collision conflicts. The path planner component includes a reach configuration component that includes data related to physical attributes, motion attributes, kinematics, and limitations of the robot. The path planner component also includes a collision avoidance evaluator configured to, using the reach configuration component, determine if an anticipated robot path results in any robot collision conflicts. A user can modify the robot path and/or the manufacture process to avoid the robot collision conflicts with the aid of the collision avoidance evaluator. The information communicated between the robot controller and the power source controller may include, for example, robot motion information, a physical weld dimension/characteristic, a material type, a tool angle/orientation, a tool velocity error, a gap condition, a target tool velocity, a motion/weave profile, and a thru-the-arc tracking correction. In one embodiment, the robot controller and the power source controller are configured to communicate the information between each other to negotiate an acceptable combination of the robot motion parameters for the robot and the electrical input parameters, which are used to generate the electrical output power, for the power source which result in collision avoidance and quality welds, depositions, or cuts.

BRIEF DESCRIPTION OF THE DRAWINGS

The above and/or other aspects will be more apparent by describing in detail exemplary embodiments of the invention with reference to the accompanying drawings, in which:

FIGS. 6A and 6B are diagrammatical representations of a layer construction of embodiments of the present invention;

DETAILED DESCRIPTION

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

The present disclosure is generally directed to systems and methods of easily allowing higher degrees of freedom manufacturing systems and robots to easily be used for manufacturing complex components and allow for the efficient conversion of a 3D computer model to g-code for higher degrees of freedom systems.

Figure 1:
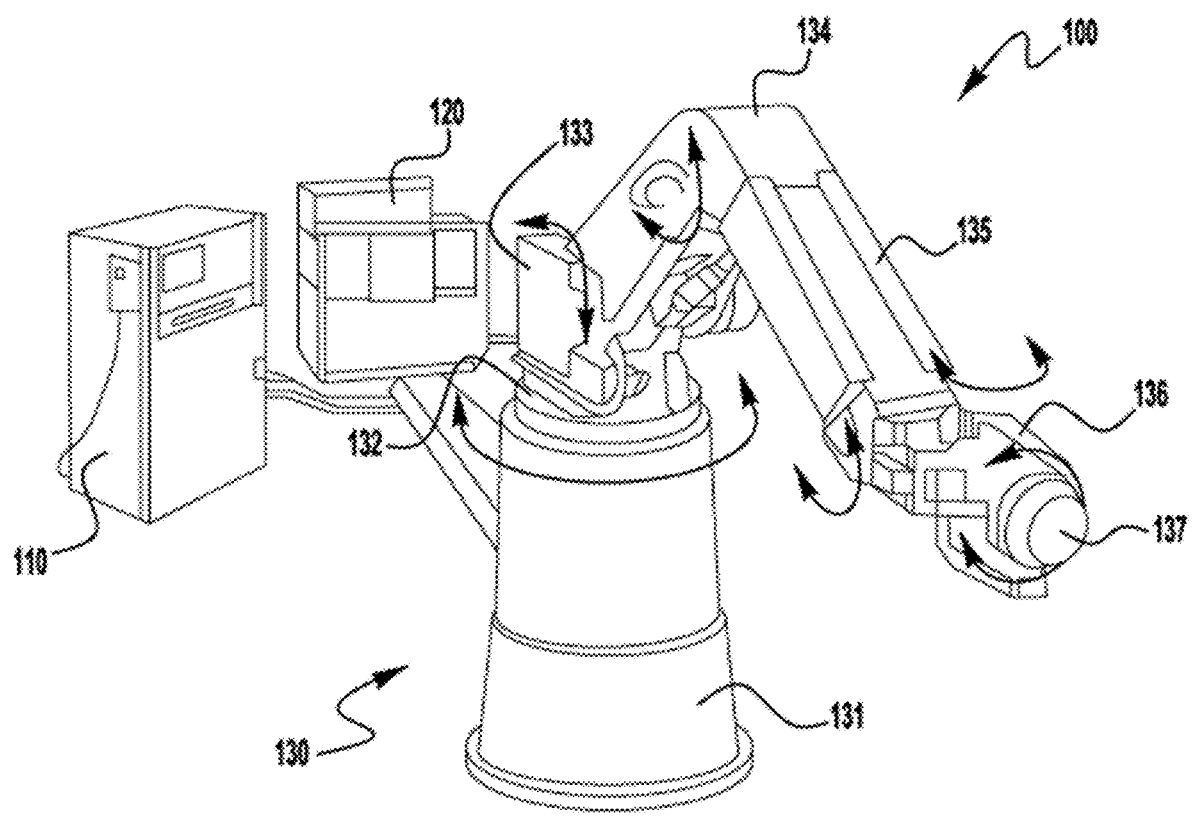
FIG. 1 is a diagrammatical representation of a high degree of freedom robotic system that can be used with embodiments of the present invention.

Turning now to FIG. 1, which shows an exemplary 6 degree of freedom robotic system 100. Such systems are generally known and as such their detailed operation and construction need not be described herein. Further, exemplary embodiments of the present invention are not limited by the specific system type or configuration used. The system 100 includes a computer controller 110 which controls the overall operation of the system. The controller 110 can include memory, a user interface, display, a CPU and other components needed to control the system 100 and the motion of the robotic arm assembly. In some systems a hydraulic unit 120 is used to control hydraulic pressure used to drive the robotic arm assembly 130. The robotic arm assembly 130 can be made up of a number of different components which allows the tool attachment point 137 to be moved with 6 degrees of freedom. For example, the assembly 130 can have a stand 131, a pivot component for arm sweep 132, a shoulder 133, an elbow 134, an arm 135, a 3-axis tool joint 136 (which allows for yaw, pitch and roll of a tool), and a tool attachment point 137, to which any desired tool can be secured. Of course, the embodiment of the robotic assembly 130 shown in FIG. 1 is exemplary and other embodiments of the present invention can use any different configurations or constructions so long as the robotic system has four (4) or more degrees of freedom for motion of a tool attached to the tool attachment point 137. The tool can be a plasma cutter, welding device, machining tool, additive manufacturing tool, etc.

It is noted that while embodiments of the present invention have applications in many different manufacturing processes, for purposes of efficiency the following discussion will focus on the process of additive manufacturing. As indicated above, additive manufacturing is only one exemplary embodiment and, therefore, this discussion is not intended to be limiting. As described above, when using a system 100 such as that shown in FIG. 1, a 3-D model of a component to be manufactured is designed using a 3-D construction program, such as CAD, etc. Once this process is done, the 3-D computer model must be translated to a language (e.g., computer code) that is usable for a robotic system to manufacture the component/part, etc. When using a 3-axis system or less, this translation is relatively simple—such as conversion for CNC machines, and the like. However, when the component is to be constructed/manufactured using a system having four (4) to six (6) axes of freedom, the 3-D computer models cannot be readily translated or utilized. Systems utilizing more than six (6) axes present an even bigger challenge. Thus, significant coding and work may be done to create machine readable code (e.g., g-code) for these higher degree of freedom systems. Embodiments of the present invention resolve this by using a g-code module to convert the 3-D image files to machine readable g-code for higher axis of freedom machines and systems. This is described more fully below.

Figure 2:
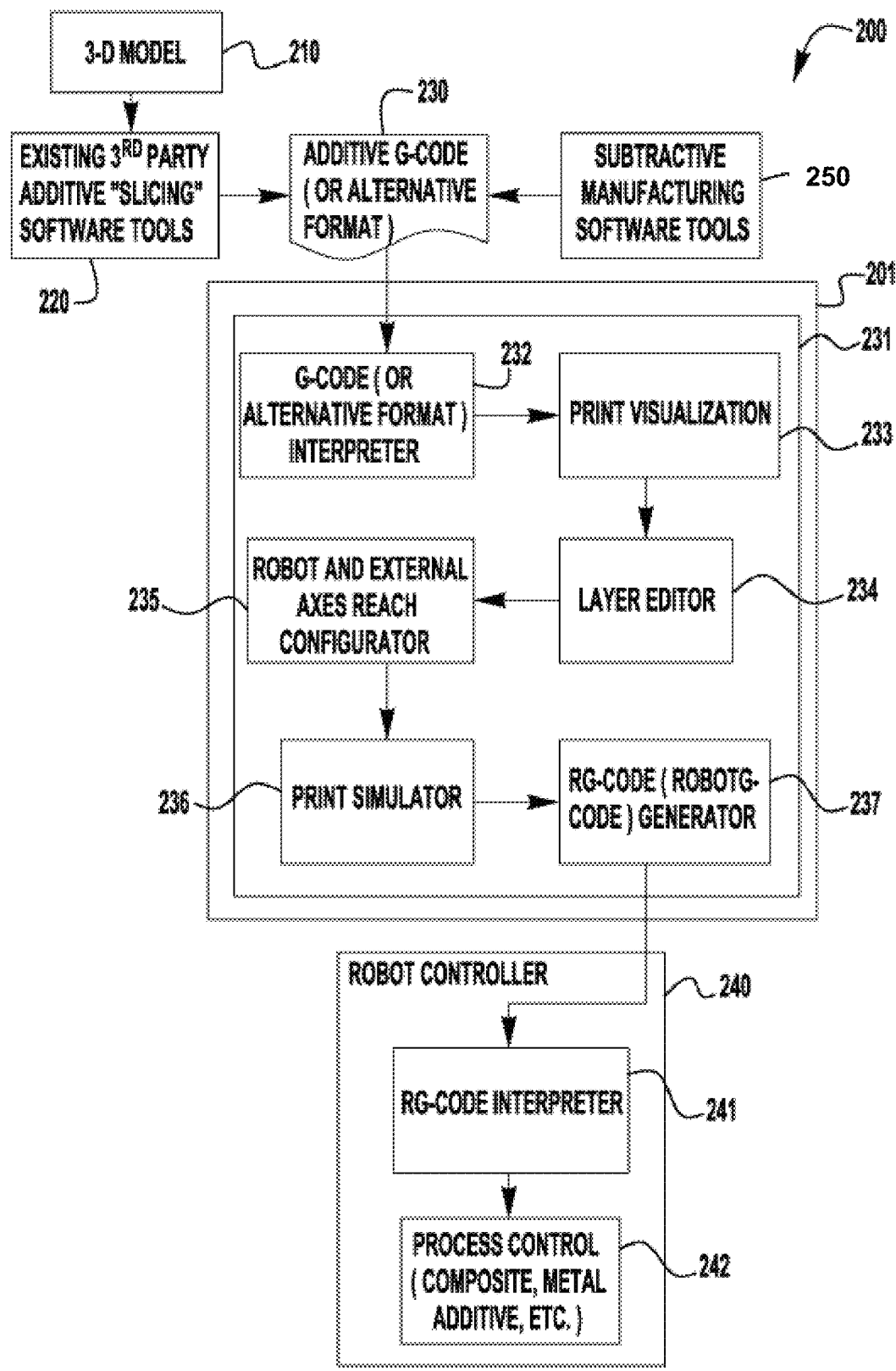
FIG. 2 is a diagrammatical representation of system construction and process flow of an exemplary embodiment of the present invention.

Turning now to FIG. 2, a flow diagram of a representative exemplary embodiment of the present invention is depicted. The flow 200 depicted represents an exemplary process flow implementing embodiments, methods and systems of the present invention, but is not intended to be limiting. The exemplary process begins with the creation of a 3-D model 210 using a known 3-D modeling program, such as CAD. This 3-D model can then be supplied to an additive manufacturing (or whatever process being used) slicing software tool for generating g-code for a 3-axis robotic system. These software tools are generally known and need not be described in detail herein. However, as explained previously, these slicing tools are incapable of generating g-code for systems having four (4) or more degrees of freedom. Therefore, in exemplary embodiments of the present invention the output of the 3-axis slicing tool 220 is provided to an additive g-code application 230 which takes the 3-axis g-code and converts it to g-code to be used with robotic systems containing three (3) or more axes. The g-code application 230 can be any known g-code application. This application 230 can be run on the system controller 110 (see FIG. 1) or any PC, controller, or other computer device capable of performing the functions and tasks described herein. In some exemplary embodiments a subtractive manufacturing software tool 250 can be used to provide inputs into the g-code application 230. The subtractive manufacturing tool 250 can be used to provide machining instructions after the manufacture of a component. Using the information provided, the g-code application 230 generates and outputs a g-code that is provided to the control program 201 of the robotic system that is used. Within, or coupled to, the control program 201 is a process control toolkit 231 that receives the g-code from the application 230. It is noted that while the term "g-code" is used, embodiments of the present invention are not limited to the use of g-code, as other alternative coding languages can be used without departing from the spirit or scope of the present invention.

In the toolkit 231, the g-code is interpreted by an interpreter 232 and provided to a print visualization component 233 which allows for the original 3D image of the part to be made to be viewed/modeled in 2D via a user screen (not shown). The component can be modeled/shown in various ways. In the exemplary embodiments, shown in FIGS. 3 through 5, the part to be made 300 is shown in a layered format being visually comprised of a plurality of layers or individual modules. These layers or modules represent construction passes or blocks of the robot 310 used to make the part 300. In some exemplary embodiments the layers are constructed across the entire cross-section of the part 300 to be made, while in other embodiments the layers or sections of the part to be made are only a portion of the cross-section of the part to be made at any given height above the substrate. This is depicted simply in FIG. 6A. In exemplary embodiments, the construction of the model 300 can be in any number and configuration of subcomponents (e.g., layers) as desired. Using this visualization of the model 300, a user can edit, via a layer editor 234, the manufacturing process (e.g., the order of creation of the layers/components as needed).

Figure 3:
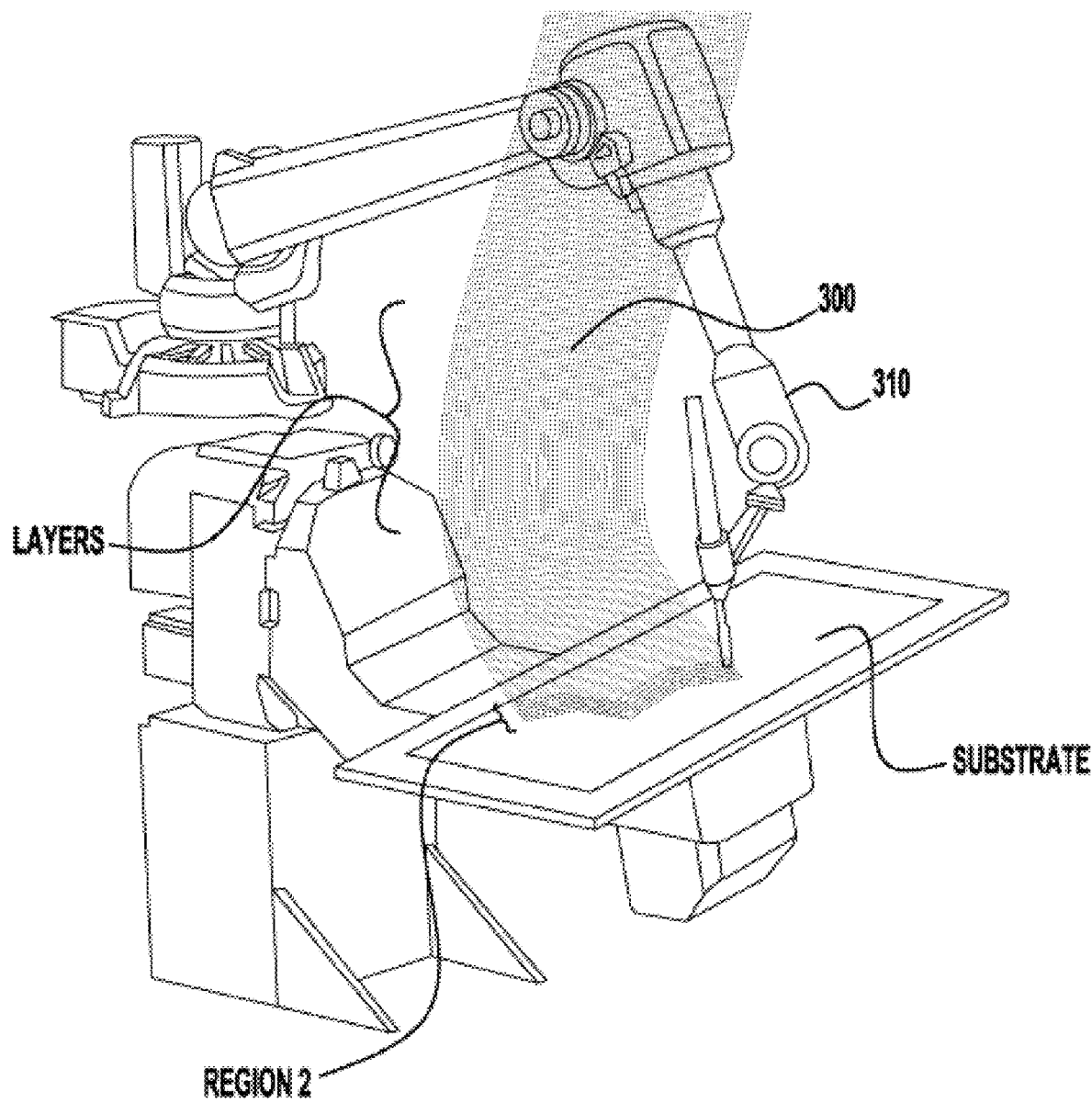
FIG. 3 is a diagrammatical representation of a visual representation of a part model in accordance with an embodiment of the present invention.
Figure 4:
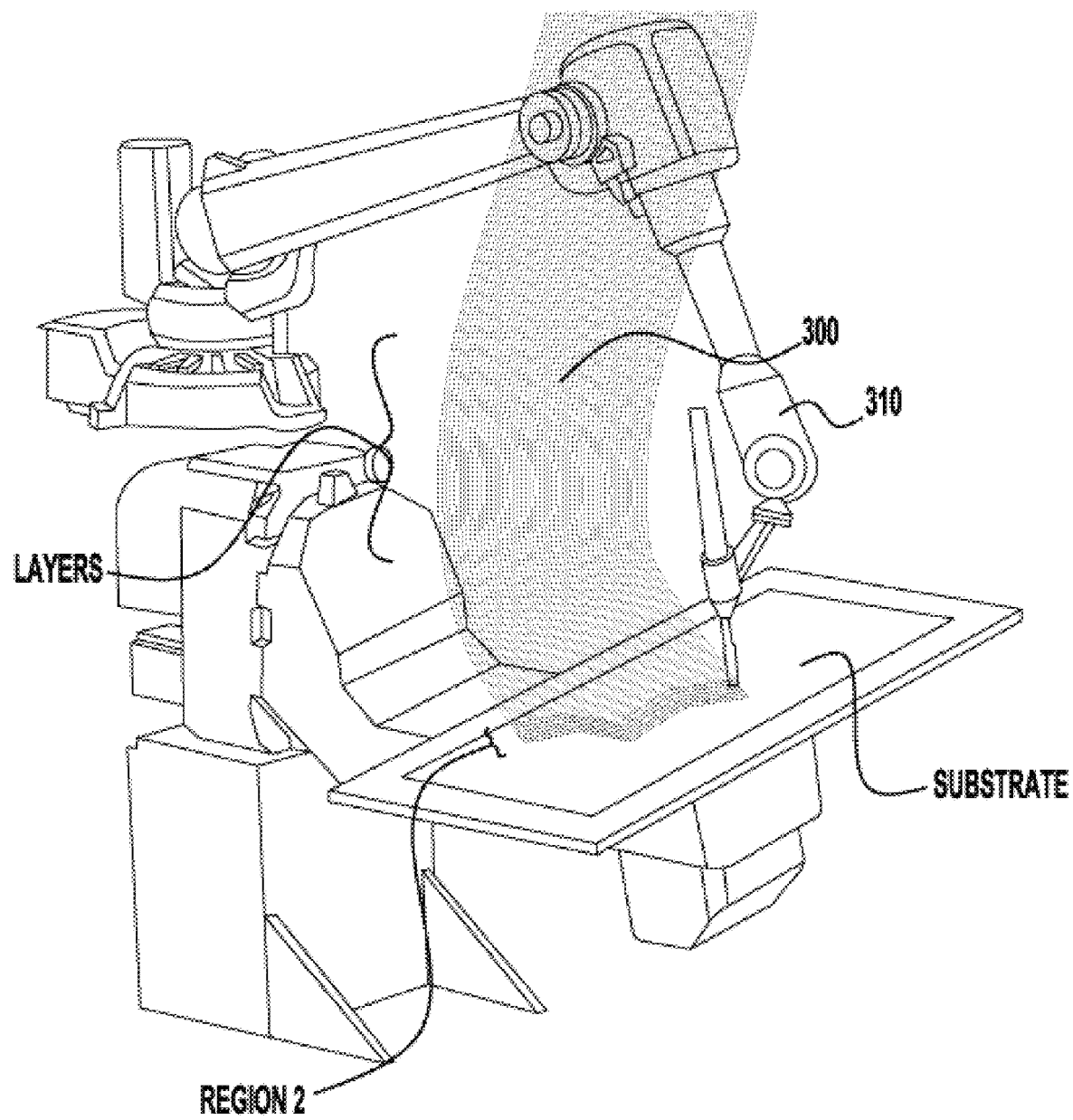
FIG. 4 is a diagrammatical representation of another visual representation of a part model in accordance with an embodiment of the present invention.
Figure 5:
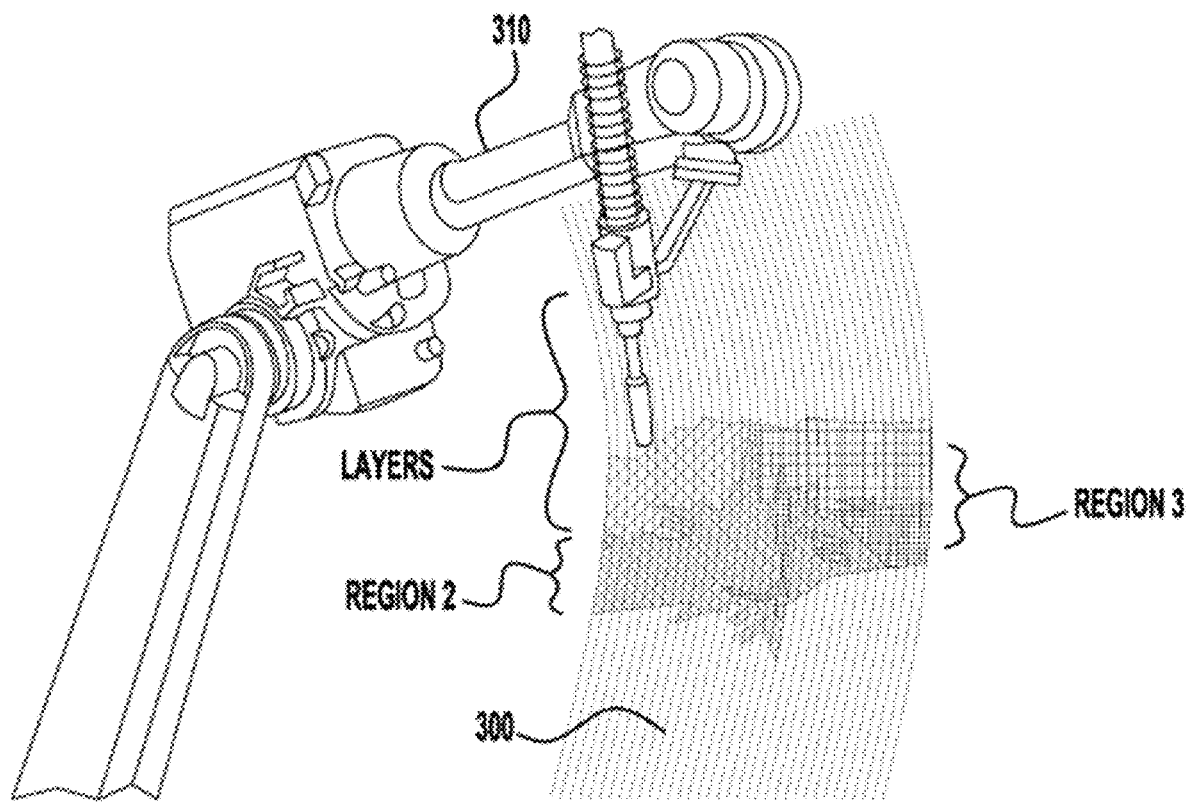
FIG. 5 is a diagrammatical representation of an additional visual representation of a part model in accordance with an embodiment of the present invention.

As shown in FIGS. 3 through 5, the print visualization component 233 can depict the 2D model in various formats, such as using color differentiation to show various aspects of the model 300. For example, in an exemplary embodiment, the component/model 300 can be depicted in a first color 300 (e.g., blue) which shows the entire completed component 300, or at least some component/portion of the component 300. The component 300 can be depicted as a wire frame model, for example.

A layer editor 234 can receive the information from the print visualization component which can allow a user to specifically view and/or change the order of the construction of the model to accommodate tooling needs. This will be discussed further below.

The toolkit 231 also has a robot and external axes reach configurator 235 which contains information regarding the physical and motion attributes and limitations of the robot 310 to be used to manufacture the component to be built. This information is used by the toolkit 231 to determine whether or not the component/part can be built by the robot 300 without interference or without going beyond its physical/movement capabilities. That is, this information is combined with the information related to the component to be built to determine if the robot 300 can manufacture the part without tool/robot interference. The output of this analysis is provided to a print simulator 236, which simulates the manufacture of the part/component 300 using the information related to the model 300 and from the robot and external axes reach configurator 235. In an exemplary embodiment, the print simulator 236 can visually depict the construction of the model/component 300—showing the movement of the robot 310 as it completes the entire model 300. In other embodiments, the user interface of the controller 110 (or other user interface) allows a user to select specific portions or layers of the model 300 to focus on the modeled construction/creation of those layers/sections. After a specific portion of the model 300 is selected the print simulator 236 will model/show the construction of the selected layers/section. In some exemplary embodiments, the actual movement of the robot 310 will be depicted, while in others the movement of the robot and/or the tool is not shown.

In exemplary embodiments, the print simulator 236 can use different visual indicators (e.g., colors) to depict different areas of the model 300 based on its buildability. For example, as explained above, the model 300 is depicted in a first color to show the overall construction of the part to be made. A second color (e.g., green) is used to show the portions of the model 300 (or portion thereof) that can be constructed with the robot system. That is, the second color (second visual indicator) shows the user (via a monitor or user interface) that the indicated portion can be made without an issue. This is depicted in each of FIGS. 3 through 5 as "Region 2". Further, as regions are shown with a second visual indicator that can be made, the toolkit 231 also visually depicts regions of the model 300 that cannot be made using a third visual indicator. For example, the system can depict regions or portions of the model 300 that cannot be made by the robot system with a third color (e.g., red). This is depicted in FIG. 5 as "Region 3". Thus, a user could determine—visually before an actual manufacturing process is performed—the manufacturability of the part. For regions that are shown as being incapable of manufacture—for example, due to limitation of the robot, the tool, etc., the layer editor 234 allows a user to change the order of layers or portions of the component to be manufactured to provide an order that allows the part to be made without issue. That is, after the layer editor 234 is used, the order at which the portions or layers of the part to be made can be changed to provide an order of construction to allow the part to be completely made by the robot without interference. This is generally shown in FIGS. 6A and 6B.

As shown in FIG. 6A, a part 300 is to be made using a robotic system, for example, using additive manufacturing. Using the 3D model data, a visual rendering of the part 300 is shown where each layer of the party 300 has four (4) subcomponents, for a total of thirty-two (32) subcomponents. FIG. 6A depicts the order with which these subcomponents are constructed after the initial print visualization and print simulator. However, because the print simulator 236 rendered some of the subcomponents in such a way as to indicate that they cannot be made by the robot (e.g., showed them in red) the user uses the layer editor 234 to adjust the order of creation of the subcomponents. This adjustment is reflected in exemplary FIG. 6B. As shown in this figure, the order of construction has been changed such that the subcomponents for steps 7-12 have been changed. For example, the additive manufacturing process that originally was intended to be deposited after step 6 (i.e., step 7) has now been moved to be added on top of the step 5 process, instead of on top of the step 3 process. Similarly, the original steps 23 to 30 have been changed. To be clear, these changes do not result in changing the physical properties and dimensions of the part 300 to be made, but rather change the order of construction of the part to ensure it can be made by the high axis robotic system. Thus, the toolkit 231 allows a user to have a visual rendering of the construction of the part on the robotic system, and to modify the construction order of the part to ensure the part can be created. The user can continually use the layer editor 234 to change the order/process as needed.

Upon completion of the process, manipulation the output from the print simulator 236 is provided to an RG-code generator 237 which generated the g-code for the high axis robotic system to be used for construction. Of course, other code formats besides g-code can be used, and would depend on the robotic system being used. The newly developed RG-code is then supplied to the robotic system controller 240, where it is interpreted 241 and the process is implemented 242.

In other exemplary embodiments of the present invention, the user can insert or add other manufacturing process steps, such as material removal as needed during the process. For example, it may be the case that no change in the order or process of part construction alleviates a tool blockage scenario. Therefore, it may be necessary to add a different processing step, such as material removal, prior to continuing construction of the part. This can be done via the layer editor 234 where a user can add a material removal (or other) processing step to remove some material, prior to continuing the manufacturing process.

Similarly, a user can add a tool change step using the layer editor 234. For example, it may be desirable to use a first tool for a part of the manufacturing of the part because it has a high deposition rate. However, this first tool may have physical sizes/limitations that prevent it from being usable at certain points during fabrication. Therefore, the layer editor 234 allows a user to add a tool change (for example to a smaller tool) to complete certain portions of the manufacture. While the second tool may have a smaller deposition rate (for example), it can have smaller dimensions allowing it to be used without creating an interference or construction issue. Further, in some exemplary embodiments, the print simulator 236 can render the visual model and suggest a tool change using a visual indicator. For example, a portion of the image can be rendered with a 4th color (such as orange, etc.) to indicate that a tool change may be needed to complete manufacturing. In some of such embodiments, the user can insert the tool change command or choose instead to change the order of manufacture/build-up in an effort to eliminate the need for a tool change.

In further exemplary embodiments, the toolkit 231 has (or has access to) service information for each of the tools that can be used with the robot system including information related to service or tool clean requirements. With this information, the print simulator 236 can render the model to be constructed and show the need or recommendation for a tool clean operation during manufacture. For example, the toolkit 231 can determine that the part to be constructed requires 500 cm$^3$ of material. However, the tool selected must be cleaned/replaced/checked after deposition of 300 cm$^3$ of material. In such a case, the print simulator 236 can provide a visual indication of the need of a tool clean/check operation. This visual indication can be provided in any number of ways including using another color indication (e.g., gray, black, etc.) or any other method of visually indicating the need for a tool clean/check. Further, in exemplary embodiments, the toolkit 231 can have access to tool service information such that the overall system keeps track of the total usage of the tools available to the robotic system such that, even though the duration between tool cleans/checks is typically longer than what is needed for a give part, that duration may be reached during the construction of any one part. For example, if a given tool clean/check point is to be every 5,000 cm$^3$ of material deposited and the part being made is only 500 cm$^3$, because of prior use of the tool, that tool check may be needed during the creation of any given part. Thus, at that time the user can choose to clean/check the tool prior to beginning the manufacture process and thus clear the indication so that no check/clean is needed during construction.

It is noted that while the example above focused on volume of material being deposited, the system can also use other parameters, such as run time, energy usage, linear deposition distances, etc., or any combination thereof.

In additional exemplary embodiments, the layer editor 234 can allow a user to delete or remove layers or portions of the part to be manufactured. For example, it may be desirable to confirm the manufacturability of only a portion of the part to be made. Therefore, a user can delete portions or layers of the model to be constructed so that only a partial part can be made.

Figure 7:
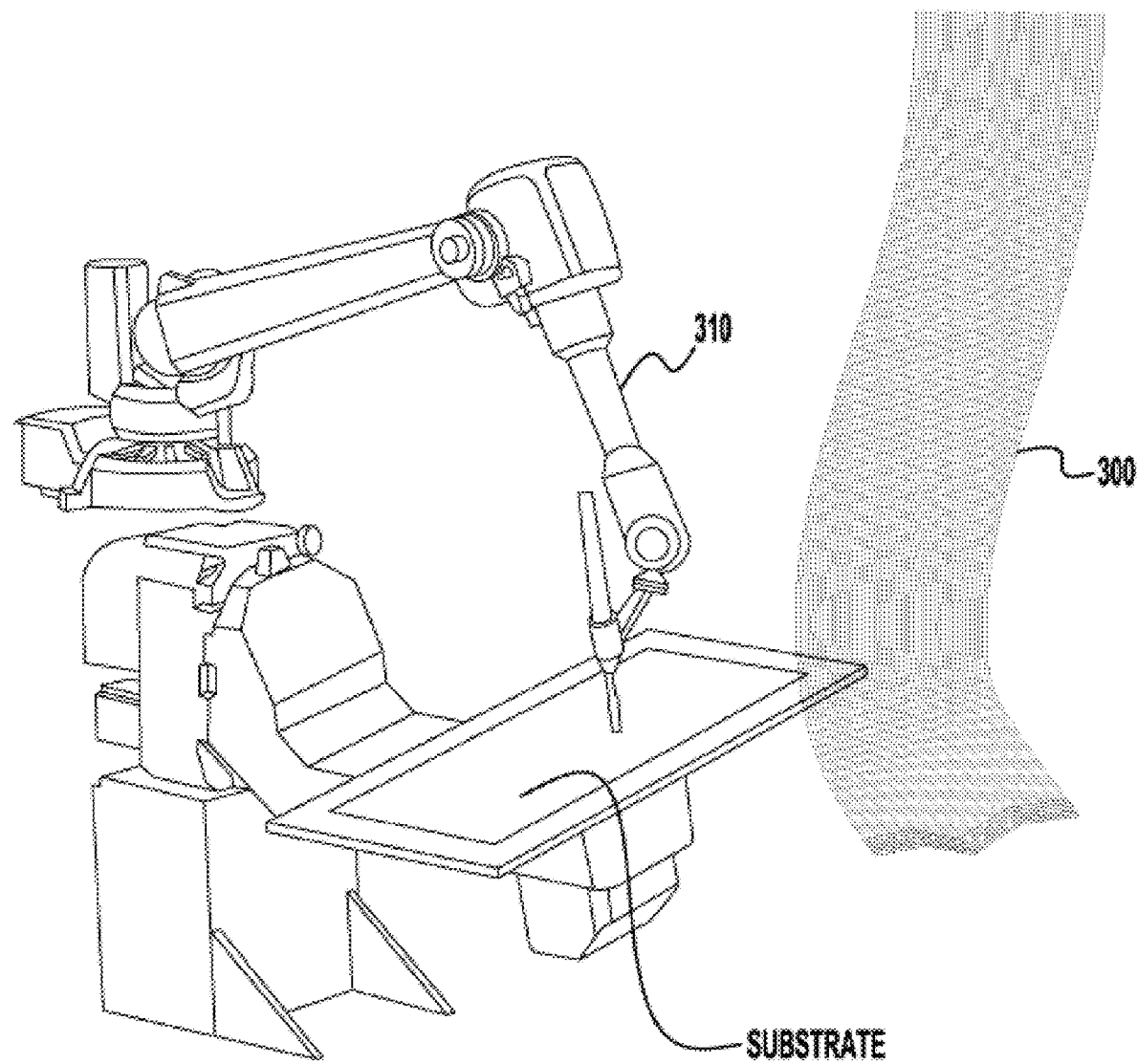
FIG. 7 is a diagrammatical representation of a further visual representation of a part model in accordance with an embodiment of the present invention.

In additional exemplary embodiments, the layer editor also allows a user to manipulate or change the location and/or orientation of the manufacturing/process paths. This is generally shown in FIG. 7, where the model 300 can be moved and/or rotated as needed to select a position and orientation of construction of the part to be made. That is, in some instances, the orientation/starting point of the part may need to be changed to facilitate part construction. Thus, the user can use the layer editor 234 to change the positioning and/or orientation of the part which may eliminate any part manufacturing warning indicators without having to change an order of layer construction.

The changes and edits to the process described above can be done via any known user interface and GUI type systems (e.g., a computer display and a mouse/keyboard combination) coupled to the system controller. Furthermore, the above can be done "off-line" on a computer system having the above described toolkit, which then creates an RG-code file that can be delivered, via any known methodology, to the robot system controller.

Therefore, the embodiments described above can determine the constructability of a part or a portion of a part using the physical attributes of the part, the physical capabilities and limitations of the robot system, and the limitations of the tool on the robot to determine the manufacturability of the part, or portions thereof. This can significantly optimize manufacturing processes using high degree of freedom robotic systems.

In further exemplary embodiments, additional robotic axes can be utilized and incorporated in the embodiments described above to allow for the additive printing in multiple planes and/or directions. For example, embodiments of the present invention can be utilized and incorporated into robotic systems having capabilities in more than six (6) degrees of freedom.

Figure 8:
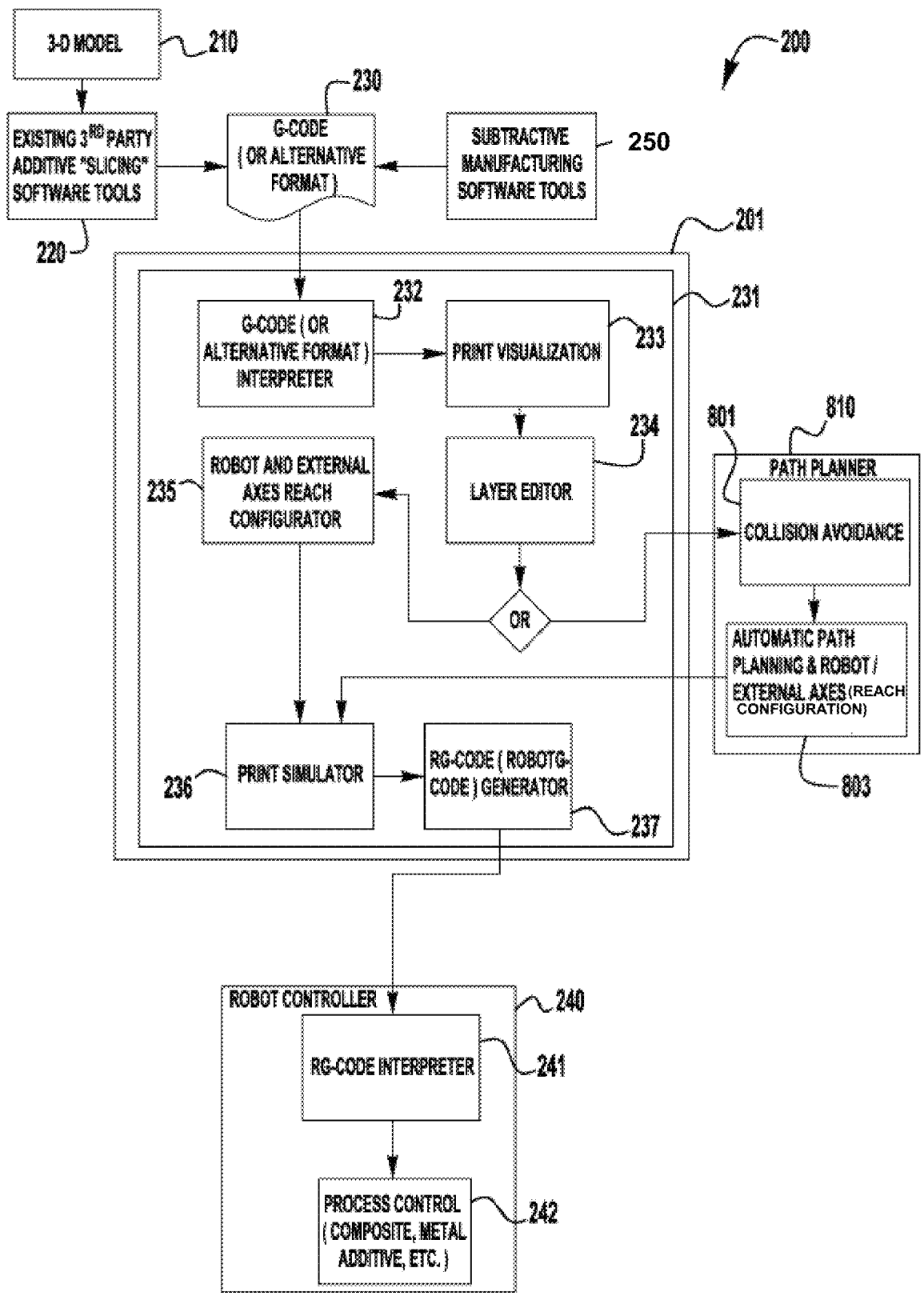
FIG. 8 is a diagrammatical representation of an additional system construction and process flow of an exemplary embodiment of the present invention.

Further, in additional embodiments, a path planner can be utilized to aid the user and make the process more efficient. For example, the path planner can aid in minimizing or eliminating a user's effort in time in the robot and external axes reach configurator 235. An exemplary embodiment of this is shown in FIG. 8. FIG. 8 depicts an implementation similar to that shown in FIG. 2, and like items and components are shown with the same numerical identification. However, as shown in this embodiment, downstream of the layer editor 234 is an optional path planner 810 that can be used by a user if needed. The path planner 810 comprises a collision avoidance evaluator 801 and an automatic path planning & robot/external axes reach configuration portion 803. In one embodiment, the path planner 810 utilizes each of these components to automate and reduce manual intervention in robot and external axes reach configurator 235. In one embodiment, the path planner 810 utilizes each of these components to allow a user to determine if the anticipated robot path for manufacture results in any robot collision situations and allows the user to modify and/or adjust the path or manufacture process to avoid the identified collision issues. Further, with the configuration portion 803, the system 200 can automatically modify or recommend modifications to avoid any identified collision or conflict points during the manufacture process. This will aid the user in reducing time or eliminating altogether the time spent in the layer editor 234 and the print simulator 236, for example. Following the use of the planner 810 the output of the planner is passed to the print simulator 236 and the process can proceed as described above.

With the use of the planner 810 as described above, robotic implementations using multiple robotic arms can be easily utilized. For example, rather than a single robotic arm (as shown in FIG. 1) two or more robotic systems/arms are used to manufacture a single item, or multiple items on a single substrate. In such applications each separate robotic system can be depositing a different material, if a composite construction is needed. In such systems collision avoidance can become extremely complex, and thus embodiments described herein make this easier to accomplish. That is, in such embodiments the planner 810 can be provided with all physical and movement information/capabilities of all the robotic systems involved, and a user can utilize the information in the planner to ensure that no collision conflict exists between the robotic systems. Moreover, the planner 810 provides the user with tools to easily identify collision/conflict areas, can provide recommended solutions based on its stored information, and allow a user to easily modify robot paths and the order/timing of material deposition to optimize robot paths. In fact, embodiments of the present invention can allow multiple, high axis robots to work simultaneously on a single point.

Embodiments of the present invention will allow for significantly more manufacturing flexibility with minimal effort and potential interference conflict. For example, embodiments can utilize high axis systems to manipulate the angle of print/deposit to achieve overhangs, etc. without having the need to use material removal efforts post manufacturing, and as part of a single process that does not require repositioning of the part for a second pass of the system. Further, embodiments can provide the robotic system with the ability to weave the robot motion to achieve varying material deposition at different points, or otherwise change the bead profiles at different locations on the part.

Moreover, embodiments of the present invention can monitor and process feedback control during various manufacture processes to achieve consistency in material deposition rate, material properties, quality and geometrical accuracy of a finished part. Moreover, the system 200 can utilize this feedback information during a given manufacturing process to "learn" about performance limitations or ability limitations of the robotic system. For example, during the manufacture of a first part or component, the system can monitor the feedback of the deposition process and correlate that feedback with the robot parameters such as speed, orientation, current, voltage, wire feed speed, arm configuration etc. Using that information, the system can determine that certain configurations have performance limitations based on the robotic system used. For example, the system can determine that a configuration using motion exceeding a certain rate when the printing head is upside down has performance limitations leading to quality issues. Therefore, when a second part is to be manufactured using a similar robotic pass with similar parameters, the system can warn the user that this proposed path with these proposed properties can present quality issues. This will allow the user to modify the path/process as described herein to avoid the quality compromising parameters. Moreover, in some embodiments the system could lock out certain combinations of parameters to ensure that they do not occur, and thus the planner 810 could be used to plan around these configurations.

Embodiments of the present invention can also be utilized to interweave multiple print passes within a single workzone to optimize efficiency while waiting between print layers for cool down. It is generally known that, in certain deposition techniques, cool down may be needed to avoid compromising the part being manufactured. The system disclosed herein can determine when, during the process, those cooldown periods are needed based on the manufacturing and process data input. That is, in determining how to the manufacture the part (as described herein), the system can also determine when a cooldown in a certain area is needed. The system can then direct the process to deposit at a different area/region of the same component to continue the manufacturing process while the other region cools down. For example, the system described herein can use the process information (e.g., current, speed, power, part geometry, etc.) to evaluate heat input into a specific region of deposit and identify those regions during the use of the toolkit 231 to allow a user to adjust the process to avoid overheat situations. Moreover, in some embodiments, once the system determines that a total heat input into a region of the part exceeds an acceptable threshold, the system automatically identifies a second region of the part to manufacture while the first region reaches a temperature at which it is acceptable to return and continue deposition. That is, the system can automatically plan a manufacture path/order that takes into account heat input and a desired temperature control process during manufacture. Of course, in those situations where a second safe temperature region does not exist (for example if the part is too small), the system will automatically wait for a determined period of time before the process begins again. That is, the system can determine, based on the overall heat input into a volume/region, a desired cooldown period before deposition can reoccur in that region.

Figure 9:
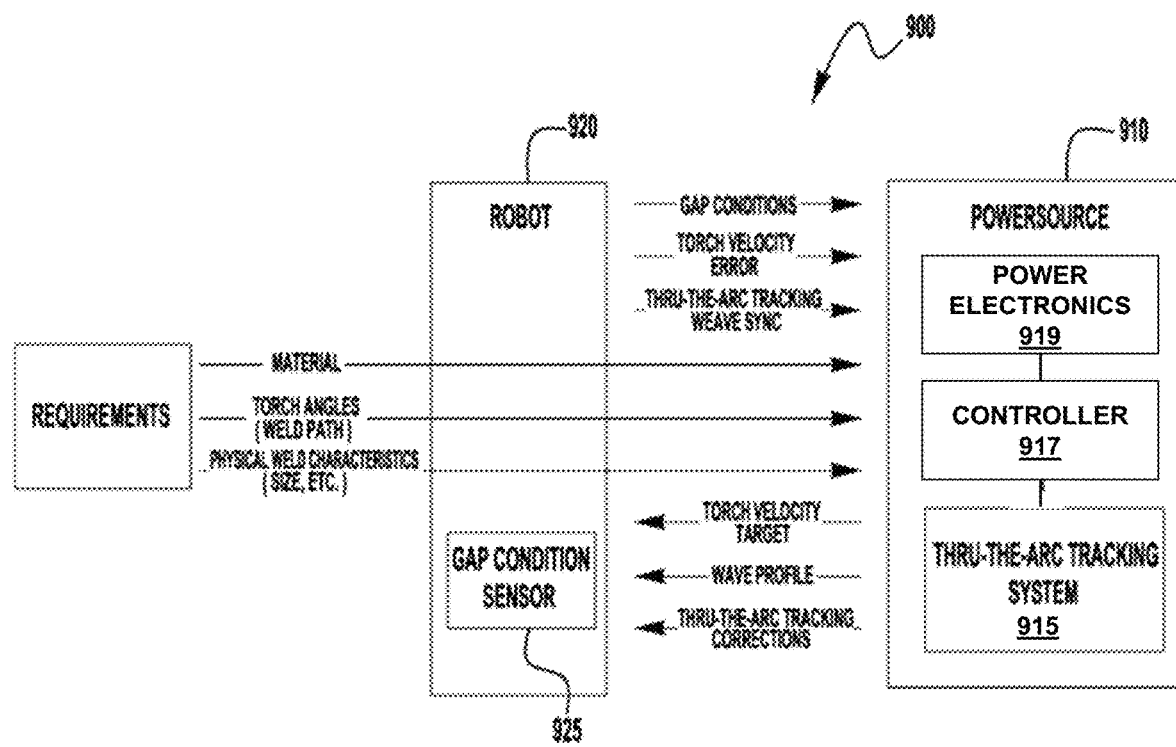
FIG. 9 is a diagrammatical representation of a further exemplary embodiment of a system of the present invention.

FIG. 9 depicts another exemplary embodiment of the present invention. It is generally known that in existing systems the welding/deposition process is controlled by specifying the traditional welding parameters/variables, such as voltage, current, power, mode, and/or schedule, as well as others. However, in a complex additive manufacturing application these variables represent a small number of the total variables that should be taken into account to achieve a weld/deposit with certain physical dimensions, characteristics, and qualities. Other parameters that are to be considered, or that can affect the end product, include robot motion profiles, thru-the-arc tracking/feedback configurations, and customer part specifications, such as material types, gap conditions, torch angles, etc.

In existing systems, a programmer/developer usually has significant experience and intimate knowledge of the multiple ways these factors interact in order to generate a robot program that achieves a desired result. This is highly inefficient and is subject to considerable opportunity for defect and error. In the embodiment shown in FIG. 9, the system employs a power supply (a.k.a., a power source) 910 which is configured and constructed similar to known welding power supplies (e.g., having power electronics 919 configured to generate electrical output power based on electrical input parameters). However, the power supply 910 in the system 900 also accepts additional input parameters beyond the traditionally known inputs (current, etc.) and uses this additional information to aid in controlling its output to achieve a desired finished product.

For example, in one embodiment of the preset invention, the power supply 910 accepts information about the weld geometry (or more generally, the manufacture geometry) itself, including material properties, torch angles to be used during the manufacture at different points, weld geometry and weld physical characteristics, among others. The control system 917 of the power supply 910 (which can be any known controller/computer type capable of performing as described herein) would recognize, interpret and utilize this additional information to provide motion information (motion parameters) to the robot motion platform 920. This is not traditionally done as known systems do not receive motion information from the power supply.

Additionally, the power supply would accept, interpret, and use motion information from the robot motion platform 920 and use that information to control its output to achieve the desired physical properties of the part. This information from the robot, such as robot movement/position, would be used by the power supply to adapt its output (electrical output power) as the motion is occurring. For example, the robot would send motion data to the power supply to reflect the deposition angle/orientation (for example, deposition could be upside down), the power supply utilizes this motion data from the robot, couples that data with the parameters it has received for the part to be manufactured, and adapts (adjusts) its output as the motion is occurring to achieve the desired result.

For example, the power supply may determine that to maintain a constant thickness of a portion of a part during manufacture, where the robot is moved from a print down to a print up orientation (for example to avoid collision), the power supply will automatically change its power output, wire feed speed, peak current levels, and even output current waveform (as examples) as the robot transitions in print orientation to maintain a constant bead thickness, etc. Thus, rather than a user having to input parameter changes for each aspect of the process, the power supply, using lookup table, deposition algorithms, etc. and its input data and data from the robot can automatically change its output to achieve a desired physical result in the deposition.

This is done because the power supply 910 has input information regarding the end result of the part, such as desired weld geometry, etc. That is, the power supply 910 would model the complex relationships of all, or at least some, of the many variables discussed above based on its programming to ensure a desired physical result is achieved. The power supply can include a feedback system/circuit 915 such as a through-the-arc circuit to track parameters during deposition. Further, the power source 910 would accept feedback from the robot motion platform 920 that can include, physical weld dimensions/characteristics, material type, weld torch angles/orientation, torch velocity error, gap conditions, etc.

Thus, in exemplary embodiments, the only information needed from the user (or robot programmer embodiments described above) for the power supply would be physical weld dimensions/characteristics (e.g., size, type, etc.), material properties, and the robot motion path. With this information, the power source would output information that is related to the robot motion platform (motion parameters), including target torch velocity, weave profiles, and other robot specific parameters, while at the same time controlling its own welding output current waveform, wire feed speed, etc. to achieve the desired deposit. Thru-the-arc tracking corrections can be corrections needed to the robot motion control based on detected feedback from the process. For example, the system can monitor voltage, current, power etc.

thru-the-arc and determine that motion, velocity, path corrections needed to be made by the robot, in addition to possible changes in the power supplies output to achieve the desired construction.

This is generally shown in FIG. 9, where the manufacturing requirements of material type, torch angles/path and weld characteristics (i.e., the part requirements) are provided to the power supply 910. In some embodiments, at least some of this information is also provided to the robot system 920. Using this information, the power supply 910 provides a torch velocity target, motion/weave profile, and any thru-the-arc tracking corrections to the robot system 920, as well as modifying its own output/wire feed speed for the process. During the process, the robot system 920 also provides at least gap conditions/feedback (detected by a gap sensor 925, for example), any torch velocity error/feedback, and other robot specific parameters to the power supply 910, which again uses this information to control the robot and modify its output.

In exemplary embodiments, the power supply 910 can house/include the toolkit 231 described above and/or the entirety of the system/process 200 described above. Of course, the power supply 910 comprises a computer/controller and user input components that allow for implementation of the above described embodiments. The computer/controller can use stored data, look up tables, performance algorithms, etc. to determine the appropriate controls and output to achieve the desired part fabrication.

In accordance with one embodiment, a robot controller (e.g., 110 or 240) and a power source controller (e.g. 917) communicate information between each other to negotiate an acceptable combination of robot motion parameters for the robot and electrical input parameters (which are used to generate electrical output power) for the power source which result in collision avoidance and quality welds, depositions, or cuts. For example, robot motion parameters and power source electrical input parameters may be negotiated which trade off some weld quality over a portion of a weld (while still providing an acceptable weld quality) in order to avoid a collision. As another example, robot motion parameters and power source electrical input parameters may be negotiated to provide an alternative path for the robot (which still avoids collisions but may add some time to the weld process) in order to maintain a highest level of weld quality. In one embodiment, various tables and algorithms are developed which allow an acceptable combination to be negotiated and which are programmed into the robot controller and the power source controller.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiment disclosed, but that the claimed subject matter will include all embodiments falling within the scope of the appended claims.

What is claimed is:

1. A system, comprising:
    a tool configured to be used in a manufacture process on a workpiece;
    a robot including:
        an arm having an attachment point, the arm configured to move the tool, when attached to the attachment point, in multiple degrees of freedom during the manufacture process, and
        a robot controller configured to control movement of the arm based on motion parameters to perform the manufacture process via the tool; and
    a power source including:
        power electronics configured to generate electrical output power, based on electrical input parameters, wherein the electrical output power is provided to the tool during the manufacture process, and
        a power source controller, wherein the power source controller and the robot controller are configured to communicate information between each other and negotiate a combination of the motion parameters for the robot and the electrical input parameters for the power source,
    wherein at least one of the robot controller or the power source controller includes at least one processor and a non-transitory computer-readable medium storing a path planner component including instructions that when executed by the at least one processor cause at least one of the robot controller or the power source controller to generate the motion parameters used to perform the manufacture process while avoiding robot collision conflicts.

2. The system of claim 1, wherein the manufacture process includes a welding process.

3. The system of claim 1, wherein the manufacture process includes an additive manufacturing process.

4. The system of claim 1, wherein the manufacture process includes a cutting process.

5. The system of claim 1, wherein the information communicated between the robot controller and the power source controller includes robot motion information.

6. The system of claim 1, wherein the information communicated between the robot controller and the power source controller includes a physical weld dimension/characteristic.

7. The system of claim 1, wherein the information communicated between the robot controller and the power source controller includes a material type.

8. The system of claim 1, wherein the information communicated between the robot controller and the power source controller includes at least one of a tool angle/orientation, a tool velocity error, or a target tool velocity.

9. The system of claim 1, wherein the information communicated between the robot controller and the power source controller includes a gap condition.

10. The system of claim 1, wherein the information communicated between the robot controller and the power source controller includes a motion/weave profile.

11. The system of claim 1, wherein the information communicated between the robot controller and the power source controller includes a thru-the-arc tracking correction.

12. The system of claim 1, wherein the robot controller and the power source controller are configured to communicate the information between each other to negotiate the combination of the motion parameters for the robot and the electrical input parameters for the power source which result in collision avoidance and welds via the tool as part of the manufacture process on the workpiece.

13. The system of claim 1, wherein the robot controller and the power source controller are configured to communicate the information between each other to negotiate the combination of the motion parameters for the robot and the electrical input parameters for the power source which result in collision avoidance and depositions via the tool as part of the manufacture process on the workpiece.

14. The system of claim 1, wherein the robot controller and the power source controller are configured to communicate the information between each other to negotiate the combination of the motion parameters for the robot and the electrical input parameters for the power source which result in collision avoidance and cuts via the tool as part of the manufacture process on the workpiece.

15. The system of claim 1, wherein the path planner component includes a reach configuration component including data related to physical attributes, motion attributes, kinematics, and limitations of the robot.

16. The system of claim 15, wherein the path planner component includes a collision avoidance evaluator configured to, using the reach configuration component, determine if an anticipated robot path results in any robot collision conflicts and allow a user to modify at least one of the robot path or the manufacture process to avoid the robot collision conflicts.

* * * * *